J. J. RIDER.
Corn Planter.
No. 40,281.
Patented Oct. 13, 1863.
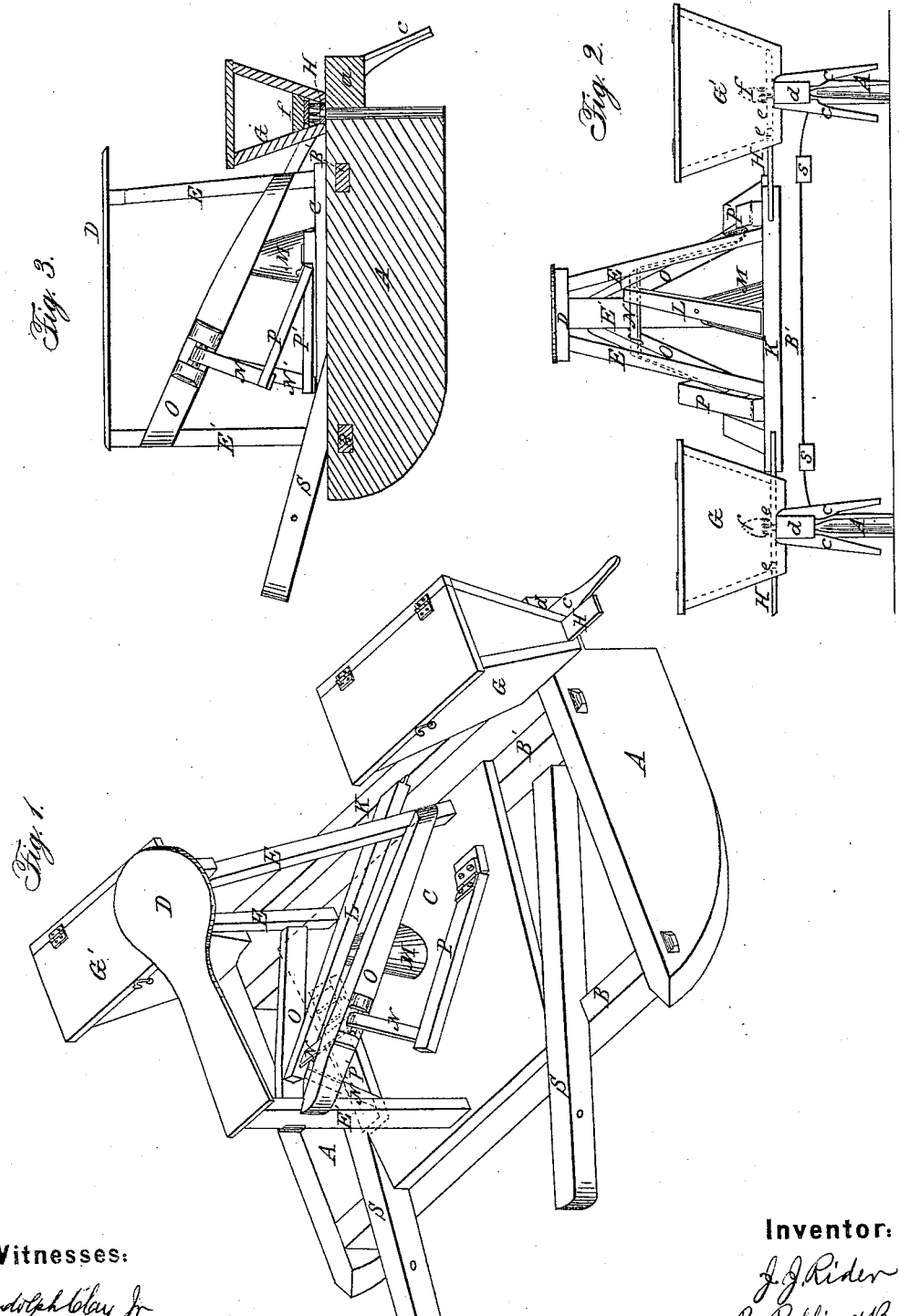
Witnesses:
Randolph Clay Jr
L. G. Hine
Inventor:
J. J. Rider
By Robbins & Burr
attys

UNITED STATES PATENT OFFICE.

J. J. RIDER, OF WILTON JUNCTION, IOWA.

IMPROVEMENT IN CORN-PLANTERS.

Specification forming part of Letters Patent No. 40,281, dated October 13, 1863.

*To all whom it may concern:*

Be it known that I, J. J. RIDER, of Wilton Junction, in the county of Muscatine and State of Iowa, have invented a new and useful Improvement in Corn-Planters; and I do hereby declare that the following is a full, clear, and exact description thereof, reference being had to the accompanying drawings, which form a part of this specification, and of which—

Figure 1 is a perspective view of my improved corn-planter; Fig. 2, a rear view of same; and Fig. 3, a sectional view of one of the runners A, showing more clearly the manner of combining therewith the seed-box G, and giving also a side view of the remaining parts of the machine.

Similar letters indicate like parts in each of the drawings.

My improved corn-planter is formed of two runners or markers, A A, Figs. 1 and 2, placed at any suitable distance apart, and united firmly by two cross-beams, B B'. Upon the front beam, B, transverse bars S S are fastened, whose rear ends are secured to the lower side of the rear beam, B', and which project forward sufficiently to form hounds, between which the tongue or draft-pole of the machine may be secured. Between the bars S S a platform, C, is laid upon the cross-beams B B', over which the driver's seat D is placed upon three standards, E' E E, secured respectively to the front and rear beams, B B', as illustrated in the drawings. The front ends of the runners A A are curved upward and their lower edges beveled to a point, so as to cut a small angular furrow in passing over the ground. The lower portion of the rear ends of each runner is cut away and grooved or channeled in a perpendicular plane at a right angle with its lower edge, (see Fig. 3,) leaving, however, a piece, *a*, at its upper edge projecting rearwardly a few inches to support the covering-forks *c c*. These covering-forks *c* and *c* are sticks or metallic blades fastened on either side of the projecting piece *a* of each runner, and made of such a length as that when thus fastened in place their lower ends shall nearly reach a plane coincident with the bottom of the runners. They spread apart as they descend from their point of attachment, and their faces, opposite the rear ends of the runners, are so cut or arranged as to make with each other (if continued) an angle more or less acute. Upon the after end of the runners are placed the seed-boxes G G, the dropping-aperture in the bottom of each being coincident with a perforation made in the projecting upper portion of the runner, directly over the groove or channel in the end of its lower portion, as clearly illustrated in Figs. 2 and 3, by which the falling seed is guided into the furrow. The dropping of the seed from each box is controlled by a slide, H, Fig. 2, resting upon its bottom, and which moves from side to side through slots cut for the purpose. These slides H H are secured to and support a bar, K, passing from one to the other between the boxes G' G. The outer movement of each slide in its box is limited by a shoulder formed at the point of its attachment to the connecting-bar K, and the length of the bar is so proportioned as that the inward or reverse movement of the slide is also checked by a shoulder similarly formed at the other end of said bar. Two seed receptacles or apertures, *e e*, are formed in each slide for the emission of a regular and uniform quantity of seeds, and are placed at such intervals apart as that when the movement of the slide is arrested in either direction one of the two will coincide with the opening of the dropping-aperture in the bottom of the box, Fig. 3. A brush, *f*, is placed in each box over its dropping-aperture to prevent the discharge of any surplus or excess of grain above the quantity contained in the receptacles *e e* of the slide.

The necessary sliding movement of the bar K and slides H H is obtained and controlled by means of an operating-lever, L, pivoted centrally upon a support, M, placed upon the platform C, beneath the driver's seat. The after end of this lever L is hinged horizontally to the center of the slide-bar K, and its front end is secured to two straps, N N', which pass over rollers arranged upon two supporting-bars, O O, secured to the front and rear standards, E' E E, of the driver's seat, as illustrated in Fig. 1. The lower ends of these straps are attached to treadles P P', hinged to blocks upon the platform on either side of the seat D, in such a position as to be readily and conveniently reached by the driver's feet when he is seated. The two straps are of equal length, so proportioned as that when the operating-lever L is drawn by one strap, N', far enough to throw the opposite shoulder of the sliding bar against the seed-box G the treadle P', connected with that strap, shall rest upon the platform, and vice versa. Thus the movement of the treadles P P', communicated through the straps to the operating-lever L, is thereby imparted to the slide-bar K and slides H H.

The draft-pole or tongue and whiffletrees of any farm-wagon can be readily attached and used with my corn-planter, avoiding the necessity and cost of an extra one.

My machine may be built wholly of wood, and its merit lies chiefly in the fact of its great simplicity, affording economy in its construction and use, and yet retaining perfect efficiency and an entire adaptation to the labor to be performed.

I am aware that the slides H H, brushes $f f$, covering-forks $c c$, runners A A, and a few other features of my improved corn-planter are old and have been heretofore used substantially as herein described.

Having thus fully described my machine in all its parts, I simply claim therein as new and desire to secure by Letters Patent—

1. The combination of the treadles P P', straps N N', operating-lever L, and slide-bar K (or their equivalents) with each other, and with the slides H H and seed-boxes G G, substantially in the manner and for the purpose herein set forth.

2. When slides H H are placed within the seed-boxes G G of a corn-planter and actuated by means of treadles P P', substantially as described, combining said seed-boxes with markers or runners A A and covering-forks $c c$, substantially in the manner and for the purpose herein set forth.

The foregoing specification of my improvement in corn-planters signed by me this 17th day of July, A. D. 1863.

J. J. RIDER.

In presence of—
F. BACON,
G. F. FASTER.